(12) United States Patent
Du et al.

(10) Patent No.: US 10,269,130 B2
(45) Date of Patent: Apr. 23, 2019

(54) METHODS AND APPARATUS FOR CONTROL OF LIGHT FIELD CAPTURE OBJECT DISTANCE ADJUSTMENT RANGE VIA ADJUSTING BENDING DEGREE OF SENSOR IMAGING ZONE

(71) Applicant: BEIJING ZHIGU TECH CO., LTD., Beijing (CN)

(72) Inventors: Lin Du, Beijing (CN); Liang Zhou, Beijing (CN)

(73) Assignee: Beijing Zhigu Tech Co., Ltd., Beijing (CN)

( * ) Notice: Subject to any disclaimer, the term of this patent is extended or adjusted under 35 U.S.C. 154(b) by 163 days.

(21) Appl. No.: 15/524,450

(22) PCT Filed: Sep. 10, 2015

(86) PCT No.: PCT/CN2015/089314
§ 371 (c)(1),
(2) Date: May 4, 2017

(87) PCT Pub. No.: WO2016/070680
PCT Pub. Date: May 12, 2016

(65) Prior Publication Data
US 2018/0276834 A1 Sep. 27, 2018

(30) Foreign Application Priority Data
Nov. 6, 2014 (CN) .......................... 2014 1 0637958

(51) Int. Cl.
*G06T 7/557* (2017.01)
*H04N 5/225* (2006.01)
(Continued)

(52) U.S. Cl.
CPC ................ *G06T 7/557* (2017.01); *G06T 7/11* (2017.01); *H04N 5/2253* (2013.01);
(Continued)

(58) Field of Classification Search
CPC ............... H04N 13/282; H04N 13/128; H04N 5/22541; H04N 5/3696; G06T 2207/10052; G06T 2200/21; G06T 7/557
See application file for complete search history.

(56) References Cited

U.S. PATENT DOCUMENTS 7,626,621 B2 * 12/2009 Ito .................. H04N 5/2253
348/294
8,305,429 B2 11/2012 Kajihara et al.
(Continued)

FOREIGN PATENT DOCUMENTS

| CN | 101610353 | 12/2009 |
|---|---|---|
| CN | 102314683 | 1/2012 |

(Continued)

OTHER PUBLICATIONS

International Search Report and Written Opinion for Application No. PCT/CN2015/089314, dated Dec. 2, 2015, 8 pages.
(Continued)

*Primary Examiner* — Jamie J Atala
*Assistant Examiner* — Michael Robert Cammarata
(74) *Attorney, Agent, or Firm* — Sheppard, Mullin, Richter & Hampton LLP

(57) ABSTRACT

Embodiments of the present application disclose methods and apparatus for control of light field capture. A depth range of a first zone, which is at least a part of a scene to be shot, is acquired. An object distance adjustment range from a pixel point of at least one imaging zone to a reference point of a sub-lens is determined according to the acquired depth range. The at least one imaging zone is an imaging zone that affects light field capture of the first zone in an image sensor of a light field camera. The sub-lens corresponds to the at least one imaging zone in a sub-lens array of the light field camera. A bending degree of the at least one imaging zone is adjusted according to the object distance adjustment (Continued)

range. After being adjusted, the image sensor captures the light field emanating from the scene to be shot.

24 Claims, 5 Drawing Sheets

(51) Int. Cl.
    *H04N 5/232*    (2006.01)
    *H04N 13/271*   (2018.01)
    *H04N 13/128*   (2018.01)
    *G06T 7/11*     (2017.01)
    *H04N 5/369*    (2011.01)

(52) U.S. Cl.
    CPC ....... *H04N 5/2254* (2013.01); *H04N 5/23212* (2013.01); *H04N 5/23229* (2013.01); *H04N 5/3696* (2013.01); *H04N 13/128* (2018.05); *H04N 13/271* (2018.05)

(56) References Cited

U.S. PATENT DOCUMENTS

| | | | |
|---|---|---|---|
| 8,619,177 B2 | 12/2013 | Perwass et al. | |
| 9,031,343 B2* | 5/2015 | Venkataraman | G06T 9/00 |
| | | | 382/250 |
| 9,270,902 B2 | 2/2016 | Wantanabe et al. | |
| 9,497,380 B1* | 11/2016 | Jannard | H04N 5/23238 |
| 2006/0044463 A1* | 3/2006 | Talley | H04N 5/2253 |
| | | | 348/373 |
| 2006/0056040 A1* | 3/2006 | Lan | G02B 6/06 |
| | | | 359/664 |
| 2008/0023036 A1 | 1/2008 | Hwang et al. | |
| 2008/0151089 A1 | 6/2008 | Street et al. | |
| 2012/0050562 A1 | 3/2012 | Perwass et al. | |
| 2012/0229679 A1 | 9/2012 | Georgiev et al. | |
| 2013/0010260 A1 | 1/2013 | Tumlinson et al. | |
| 2014/0043611 A1* | 2/2014 | Narasimhan | G01J 1/42 |
| | | | 356/402 |
| 2015/0168699 A1* | 6/2015 | Lee | G02B 17/0856 |
| | | | 348/302 |
| 2016/0103323 A1 | 4/2016 | Du et al. | |
| 2016/0182786 A1* | 6/2016 | Anderson | H04N 5/2254 |
| | | | 348/360 |
| 2017/0257588 A1* | 9/2017 | Zhou | H04N 5/232 |
| 2017/0264843 A1* | 9/2017 | Zhou | H04N 5/3696 |
| 2018/0180836 A1* | 6/2018 | Huang | G02B 7/04 |

FOREIGN PATENT DOCUMENTS

| | | |
|---|---|---|
| CN | 102439979 | 5/2012 |
| CN | 103019021 | 4/2013 |
| CN | 103353677 | 10/2013 |
| CN | 103795934 | 5/2014 |
| CN | 104038690 | 9/2014 |
| CN | 104410784 | 3/2015 |
| JP | 2006-129411 | 5/2006 |
| WO | 2008/069077 | 6/2008 |

OTHER PUBLICATIONS

Babacan et al., "Compressive Light Field Sensing," IEEE Transactions on Image Processing, Dec. 2012, vol. 21, No. 12, p. 4746-4757.

Bishop et al., "Light Field Superresolution," ICCP, 2009, Department of Engineering and Physical Sciences, Heriot-Watt University, Edinburgh, 9 pages.

Georgiev et al., "Spatio-Angular Resolution Tradeoff in Integral Photography," Eurographics Symposium on Rendering, 2006, 10 pages.

Ko et al., "A hemispherical electronic eye camera based on compressible silicon optoelectronics," Nature, Aug. 2008, 454.7205, p. 748-753.

Marwah et al., "Compressive Light Field Photography using Overcomplete Dictionaries and Optimized Projections," Proc. of SIGGRAPH, ACM Transactions on Graphics, 2013, vol. 32, No. 4, 12 pages.

Ng et al., "Flexible image sensor array with bulk heterojunction organic photodiode," Applied Physics Letters, 2008, vol. 92, p. 213303-1-3.

Yu et al., "Directed bending of a polymer film by light," Nature, Sep. 2003, vol. 425, p. 145.

\* cited by examiner

METHODS AND APPARATUS FOR CONTROL OF LIGHT FIELD CAPTURE OBJECT DISTANCE ADJUSTMENT RANGE VIA ADJUSTING BENDING DEGREE OF SENSOR IMAGING ZONE

CROSS-REFERENCE TO RELATED APPLICATIONS

This application is a National Phase Application of International Application No. PCT/CN2015/089314, filed on Sep. 10, 2015, which claims the benefit of priority to Chinese Patent Application No. 201410637958.1, filed on Nov. 6, 2014, and entitled "Methods and Apparatus for Controlling Light Field Capture", each of which is incorporated into the present application by reference herein in its entirety.

TECHNICAL FIELD

The present application relates to the technical field of light field capture, and in particular, to various methods and various apparatus for controlling light field capture.

BACKGROUND

A light field camera relates to an imaging technology that can be used for recording and reproducing a three-dimensional scene by using a sub-lens array. Generally, a sub-lens array is arranged between a main lens and an image sensor such as CCD, so as to record light field information of a three-dimensional scene in different directions by using the sub-lens array on a focusing plane of the sub-lens array.

Different from a two-dimensional image capture manner of a traditional camera, a light field camera can record four-dimensional light field information (such as space and views) of a three-dimensional scene through a single exposure, and support "shooting first and focusing later" (that is, focusing needs not to be performed during shooting). After a light field image is taken, a focus point of the light field image can be adjusted in a certain range around a focal plane with which the image is taken, and this range is referred to as a refocusing point adjustment range of the light field image. The refocusing point adjustment range of a light field camera may be acquired in advance through calculation according to characteristics and relative positions of elements of the light field camera. Within the refocusing point adjustment range, a new refocusing point may be determined at a depth interval of a certain step size, so as to acquire a refocused image based on the refocusing point from the light field image.

SUMMARY

The following briefly describes the present application, so as to provide a basic understanding of some aspects of the present application. It should be understood that, the brief description is not an exhaustive brief description of the present application. The description is neither intended to determine key or important parts of the present application, nor intended to limit the scope of the present application. An objective thereof is merely to give some concepts in a simplified manner as a preface for more detailed description hereinafter.

The present application provides various methods and various apparatus for controlling light field capture.

In one aspect, an embodiment of the present application provides a method for controlling light field capture, comprising:

acquiring a depth range of a first zone, the first zone being at least a part of a scene to be shot;

determining, according to the acquired depth range, an object distance adjustment range from a pixel point of at least one imaging zone to a reference point of a sub-lens, the at least one imaging zone being an imaging zone that affects light field capture of the first zone in an image sensor of a light field camera, the sub-lens being a sub-lens that corresponds to the at least one imaging zone in a sub-lens array of the light field camera;

adjusting, according to the object distance adjustment range, a bending degree of the at least one imaging zone; and performing, based on the image sensor after being adjusted, light field capture on the scene to be shot.

In another aspect, an embodiment of the present application further provides an apparatus for controlling light field capture, comprising:

a depth range acquisition module, configured to acquire a depth range of a first zone, the first zone being at least a part of a scene to be shot;

an object distance adjustment range acquisition module, configured to determine, according to the acquired depth range, an object distance adjustment range from a pixel point of at least one imaging zone to a reference point of a sub-lens, the at least one imaging zone being an imaging zone that affects light field capture of the first zone in an image sensor of a light field camera, the sub-lens being a sub-lens that corresponds to the at least one imaging zone in a sub-lens array of the light field camera;

a bending degree adjustment module, configured to adjust, according to the object distance adjustment range, a bending degree of the at least one imaging zone; and a light field capture module, configured to perform, based on the image sensor after being adjusted, light field capture on the scene to be shot.

According to the technical solution provided by the embodiments of the present application, for light field capture, by a light field camera, of a scene to be shot, the distance from each pixel in a corresponding imaging zone of an image sensor to a reference point of a corresponding sub-lens may be adjusted according to a depth range of at least a part (i.e., a first zone) of the scene, such that distances that correspond to the pixel points are all within an object distance adjustment range corresponding to the first zone. After the adjustment, a maximum distance difference for pixel points in the corresponding imaging zone of the image sensor relative to a reference point of the corresponding sub-lens is changed, resulting in a change in a refocusing point range corresponding to the first zone, of a light field image captured by the image sensor after being adjusted. An adjustable refocusing point range can thus be achieved, better meeting various demands of a subject such as a user or a device.

The following describes in detail alternative embodiments of the present application with reference to accompanying drawings, to make these and other advantages of the present application more obvious.

BRIEF DESCRIPTION OF THE DRAWINGS

The present application may be understood better with reference to the following description in combination with accompanying drawings, wherein a same or similar accompanying drawing mark is used in all the accompanying drawings to represent a same or similar component. The accompanying drawings together with the following detailed description are comprised in the specification and constitute a part of the specification, and are used to further illustrate alternative embodiments of the present application and explain the principle and advantages of the present application. In the accompanying drawings.

Figure 1:
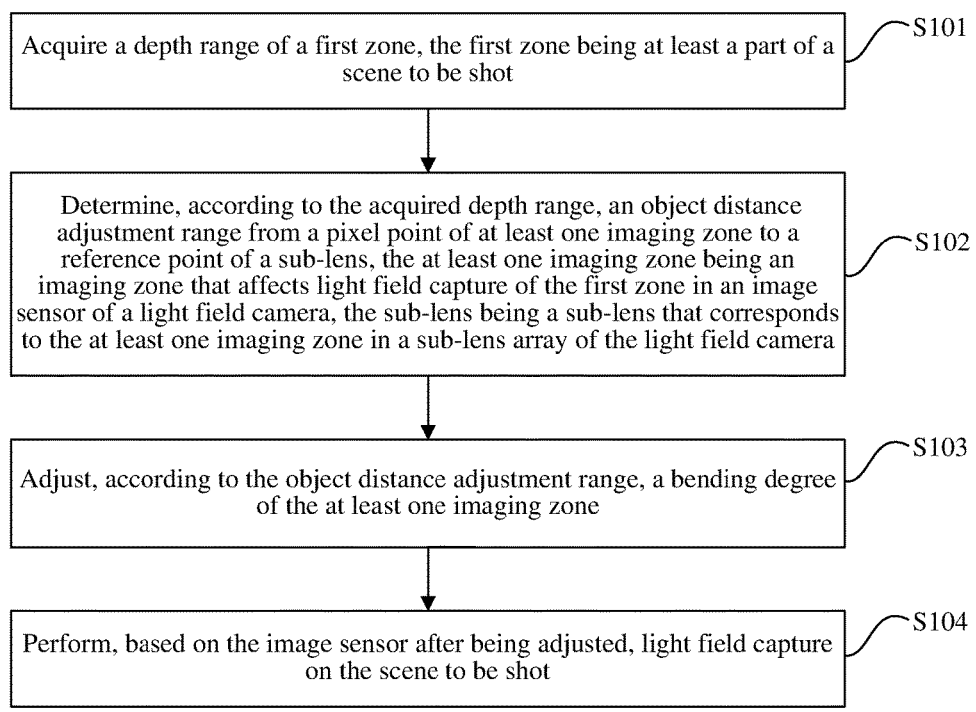
FIG. 1 is a flowchart of a method for controlling light field capture according to an embodiment of the present application.

A person skilled in the art should understand that, elements in the accompanying drawings are merely shown for simplicity and clarity, and are not necessarily drawn to scale. For example, in the accompanying drawings, the size of an element may be enlarged relative to another element, so as to facilitate enhancing an understanding of the embodiments of the present application.

DETAILED DESCRIPTION

The following will describe in details illustrative embodiments of the present application with reference to accompanying drawings. For the purpose of clear and brief description, the specification does not describe all features of practical implementation manners. However, it should be understood that, many decisions specific to the implementation manners must be made during development of any one of the practical embodiments, so as to achieve a specific objective of a developer, for example, conformance to restrictive conditions related with a system and service, wherein the restrictive conditions may vary with different implementation manners. In addition, it should also be understood that, although development work may be very complex and time-consuming, for a person skilled in the art that benefits from the content of the present disclosure, the development work is only a routine task.

Another point that should be noted here is, to avoid the present application from being not clearly understood due to unnecessary details, the accompanying drawings and specification merely describe apparatus structures and/or processing steps closely related to the solutions of the present application, but omit the representation and description of parts and processing that have little relation with the present application, and have been known by a person of ordinary skill in the art.

The following further describes in detail specific implementation manners of the present application with reference to the accompanying drawings (a same label represents a same element in several accompanying drawings) and embodiments. The following embodiments are used to describe the present application, but are not intended to limit the scope of the present application.

A person skilled in the art may understand that, terms such as "first" and "second" in the present application are merely used to distinguish different steps, devices or modules, which neither represent any specific technical meaning, nor represent a necessary logic sequence among them.

During practice of the embodiments of the present application, the inventors have recognized that, there is a certain link between a refocusing point adjustment accuracy and the refocusing point adjustment range of a light field image acquired by a light field camera capturing the light field emanating from a scene to be shot. For example, the larger a refocusing point adjustment range of the light field image acquired by a light field camera is, the lower the refocusing point adjustment accuracy is, because a refocusing point can be acquired only at a long distance from the previous refocusing point along the depth direction. Conversely, the smaller the refocusing point adjustment range of the light field image is, the higher the refocusing point adjustment accuracy is, because the refocusing point can be acquired at a short distance from the previous refocusing point along the depth direction.

In practice, a subject, such as a user or a device, may have different requirements for a refocusing point adjustment range and for a refocusing point adjustment accuracy. However, the refocusing point adjustment range of a conventional light field camera is fixed, which may fail to satisfy actual requirements of the subject. For example, in the context of such as scenery or documentary photography, the subject may desire a large refocusing point adjustment range for a light field image, so as to cover as wide a depth range of the scene as possible to facilitate acquisition of refocused images at various depths based on the light field image. However, an inherent refocusing point adjustment range of the light field camera may fail to satisfy such demands. For another example, in portrait or close-up shooting, the subject may prefer a high refocusing point adjustment accuracy of a region of interest (such as a person's face or a close-up object) in a light field image, so as to acquire more refocused images with respect to the region of interest based on the light field image. A high refocusing point adjustment accuracy may be obtained by reducing the refocusing point adjustment range, however, the inherent refocusing point adjustment range of the light field camera may not allow for this.

To this end, an embodiment of the present application provides a method for control of light field capture, to achieve an adjustable refocusing point adjustment range of a light field image captured by a light field camera, thereby better satisfying various actual demands of a subject such as a user or a device.

FIG. 1 is a flowchart of a method for controlling light field capture according to this embodiment of the present application. The method for controlling light field capture provided by this embodiment of the present application may be executed by an apparatus for controlling light field capture, wherein the apparatus for controlling light field capture can perform static or dynamic light field capture control by using the method for controlling light field capture during an application procedure, comprising but not limited to: photo taking, camera shooting, photographing, and video monitoring. There is no limit to the manners in which the apparatus for controlling light field capture is embodied. For example, the apparatus for controlling light field capture may be an independent component, the component cooperating with a light field camera in communications; or the apparatus for controlling light field capture may be integrated as a functional module into an image acquisition device comprising a light field camera, which is not limited in this embodiment of the present application.

Specifically, as shown in FIG. 1, a method for controlling light field capture provided by this embodiment of the present application comprises:

S101: Acquire a depth range of a first zone, the first zone being at least a part of a scene to be shot.

The scene to be shot is a three-dimensional scene. Depth information of the scene to be shot may comprise but is not limited to a depth map of the scene to be shot. The manner of acquiring depth information of the scene to be shot is not limited. For example, the depth information may be acquired from light field information acquired by using a traditional light field camera, or a depth map of the scene to be shot may be acquired by means of shooting with a depth sensor or a multi-view camera.

In practical application, a part of the scene to be shot may be determined as the first region according to actual demands, to acquire distribution information of the first zone in a depth direction, that is, to acquire a depth range of the first zone.

S102: Determine, according to the acquired depth range, an object distance adjustment range from a pixel point of at least one imaging zone to a reference point of a sub-lens, the at least one imaging zone being an imaging zone that affects light field capture of the first zone in an image sensor of a light field camera, the sub-lens being a sub-lens that corresponds to the at least one imaging zone in a sub-lens array of the light field camera.

The light field camera generally comprises a main lens, a sub-lens array and an image sensor that are successively arranged. The sub-lens array comprises a plurality of sub-lens distributed in an array form. Rays of light from different object points in the scene to be shot in different directions are focused through a main lens to at least one sub-lens in the sub-lens array. The rays of light focused through the main lens are separated through the at least one sub-lens. For the separated rays of light, information on light intensities and directions is recorded by the image sensor, so as to acquire imaging information (namely, light field information) of the scene to be shot in multiple visual angles and directions. The acquired light field information may be reflected as multiple parallax images that are alternately arranged, which may be referred to as a light field image.

An object distance adjustment range from a pixel point of the at least one imaging zone to a reference point of the sub-lens is determined according to the acquired depth range. The object distance adjustment range is generally used for representing an expected limiting region from a pixel point of the at least one imaging zone to a reference point of the sub-lens. The expected limiting region indirectly represents an expected refocusing point range of a light field sub-image of the first zone by a subject such as a user or a device. For example, if the subject desires to increase a refocusing point range of a light field sub-image of the first zone, so as to cause multiple refocusing points of the light field sub-image, which corresponds to the first zone, to be distributed over as large a depth range as possible of the first zone and dispersed as much as possible, a larger object distance adjustment range may be determined. For another example, if the subject expects to improve a refocusing accuracy of a light field sub-image of the first zone, so as to cause multiple refocusing points of the light field sub-image that corresponds to the first zone to be densely distributed as far as possible within at least a part of a depth range of the first zone, a smaller object distance adjustment range may be determined.

Figure 2:
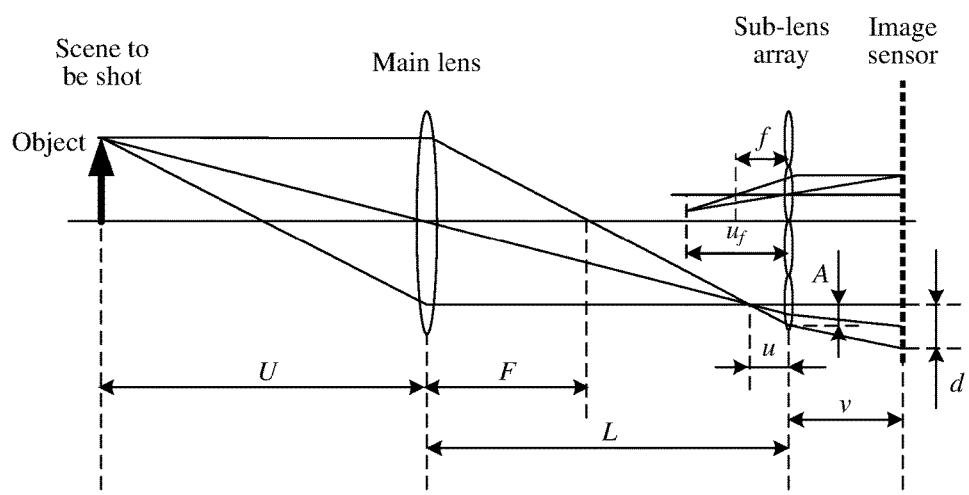
FIG. 2 is a schematic structural diagram of an optional light path of a light field camera according to an embodiment of the present application.

Specifically, according to classical theories of geometrical optics, an optical path diagram of a light field camera may be equivalent to imaging, by a sub-lens, of a real image or a virtual image formed by a main lens, on an imaging zone that corresponds to the sub-lens. Therefore, pixel points located in different positions of an imaging zone may store light field information of objects at different depths of a scene. Referring to FIG. 2, supposing a distance from a pixel point on an imaging zone to an optical axis of a sub-lens is d, for an object at a different depth in a scene, a radius of a circle of confusion of a corresponding image formed on an image sensor is as follows:

$$d = \frac{Afu_f}{u_f - f}\left(\frac{1}{u_f} - \frac{1}{u}\right) \quad (1)$$

wherein: A is a radius of a sub-lens; f is a focal length of a sub-lens; $u_f$ is a distance from a focusing plane of a sub-lens to a center of the sub-lens; and u is a distance from a real image or a virtual image to a center of a sub-lens (for a real image, u is a positive value; and for a virtual image, u is a negative value).

An imaging formula of a main lens is as follows:

$$\frac{1}{F} = \frac{1}{U} + \frac{1}{V} = \frac{1}{U} + \frac{1}{L-u} \quad (2)$$

wherein: U is an object distance from an actual object in a scene to be shot to a main lens, that is, a distance from a plane where a refocusing point is located (namely, a refocusing plane) of a refocused image that may be acquired based on a light field image to a main lens; F is a focal length of a main lens; and L is a distance from an optical center of a main lens to an optical center of a sub-lens.

An imaging formula of a sub-lens is as follows:

$$\frac{1}{f} = \frac{1}{u_f} + \frac{1}{v} \quad (3)$$

wherein: v is a distance from a pixel point of an imaging zone that corresponds to the sub-lens in the image sensor to the sub-lens.

By combining formula (1), formula (2) and formula (3), it can be obtained as follows:

$$\frac{1}{U} = \frac{1}{F} + \frac{1}{\frac{1}{\frac{1}{f} - \frac{1}{v}\left(1 + \frac{d}{A}\right)} - L} \quad (4)$$

It can be seen that, after an optical parameter of a light field camera is determined, u is in inverse proportion to v, so that a refocusing point range u may be adjusted by means of adjusting a range of v. That is, a maximum distance difference between each pixel point of the at least one imaging zone and a reference point of the sub-lens in inverse proportion to a refocusing point adjustment range of a light field sub-image that corresponds to the first zone in a light field image. The refocusing point range may be adjusted by means of adjusting the maximum distance difference.

S103: Adjust, according to the object distance adjustment range, a bending degree of the at least one imaging zone.

The image sensor in this embodiment of the present application is an image sensor in which at least a partial imaging zone is flexible, which may comprise but is not limited to a flexible image sensor. The flexible image sensor comprises a flexible lining and a plurality of image sensor pixels formed on the flexible lining, wherein the flexible lining can be changed such as bent when a certain condition is met, so as to adjust a bending degree of a surface of an imaging zone. In this embodiment of the present application, in combination with the characteristic of the image sensor that a bending degree of a surface of an imaging zone is adjustable, a distance from each pixel point in the at least one imaging zone to a reference point of the sub-lens is adjusted by means of adjusting a bending degree of the at least one imaging zone according to the object distance adjustment range, to cause the distance from each pixel point in the at least one imaging zone to a reference point of the sub-lens to fall within the object distance adjustment range. That is, distances from pixel points of the at least one imaging zone to a reference point of the sub-lens all fall within the object distance adjustment range.

S104: Perform, based on the image sensor after being adjusted, light field capture on the scene to be shot.

According to the technical solution provided by the embodiments of the present application, for light field capture performed based on a light field camera on a light field image of a scene to be shot, according to a depth range of at least a part (namely, a first zone) of a scene to be shot, a distance from each pixel point of a corresponding imaging zone of an image sensor to a reference point of a corresponding sub-lens may be adjusted, to cause all distances that correspond to the pixel points to fall within an object distance adjustment range that corresponds to the first zone. Compared with a maximum distance difference between each pixel point of a corresponding imaging zone of the image sensor before adjustment and a reference point of a corresponding sub-lens, a maximum distance difference between each pixel point of a corresponding imaging zone of the image sensor after being adjusted and a reference point of a corresponding sub-lens has been changed, thereby causing a refocusing point range of a light field image acquired by the image sensor after being adjusted that corresponds to the first zone to change accordingly, so as to achieve an adjustable refocusing point range and better satisfy diversified actual application demands of a subject such as a user or a device.

Based on the foregoing technical solution, optionally, the method for controlling light field capture may further comprise determining the first region. In the solution, a part (such as a region with a larger refocusing point range requirement, or a region with a higher refocusing accuracy requirement) of a current scene to be shot may be determined in advance according to actual demands as the first region, thereby better satisfying personalized application demands of a subject such as a user or a device.

The manner of determining the first region is very flexible, which is not limited in this embodiment of the present application. For example, the light field camera generally comprises a viewfinder to display a preview image of a current scene to be shot from a visual angle. In this embodiment of the present application, the first region may be determined based on the preview image, so as to improve convenience of use by a user.

The specific implementation manner of determining the first region based on the preview image is very flexible.

For example, the first region may be determined according to information on a region of interest (ROI for short) of the preview image, that is, ROI determining information is acquired based on a preview image of the scene to be shot by the light field camera; and a region that corresponds to the ROI determining information in the scene to be shot is determined as the first region. The region of interest may comprise but is not limited to one or more of the following: at least one region of the preview image that is selected by a user (namely, a user's selection region of the preview image), at least one region of the preview image that is gazed by a user (namely, a user's gaze region of the preview image), and a region of interest of the preview image that is automatically detected by a light field capture device. In the solution, a corresponding part of the scene to be shot is determined as the first region according to the ROI of the preview image, to cause determining of the first region to be more consistent with a user's actual demands, thereby better satisfying a user's diversified application demands.

For another example, the first region may be automatically determined according to a result of an image analysis for the preview image, that is, an image analysis is performed on a preview image of the scene to be shot by the light field camera; and the first region is determined according to a result of the image analysis. In an alternative scenario, face recognition is performed on the preview image, and a face region is determined as the first region according to a recognition result. In the solution, according to a result of an image analysis for the preview image, a corresponding region in a scene to be shot may be determined as the first region, to cause determining of the first region to be more intelligent, and improve efficiency and universality of the first region determining.

After the first region is determined, a depth range of the first region may be acquired, and the object distance adjustment range is determined according to the depth range of the first zone.

Optionally, the determining, according to the acquired depth range, the object distance adjustment range comprises: determining, according to a first depth within the acquired depth range, a minimum object distance within the object distance adjustment range; and determining, according to a second depth within the acquired depth range, a maximum object distance within the object distance adjustment range, wherein the second depth is greater than the first depth. In the solution, two end values within the whole depth range of the first zone or a depth range of a part thereof may be selected as base points for determining two end values of the object distance adjustment range, which is implemented in a very flexible manner. Further, optionally, the first depth is a minimum depth within the depth range, and the second depth is a maximum depth within the depth range. A bending degree of the at least one imaging zone is adjusted based on the object distance adjustment range that is determined in the solution, and a light field image of a scene to be shot is acquired based on an image sensor after being adjusted, to cause a refocusing point range of a light field sub-image that corresponds to the first zone in the light field image to be dispersedly distributed in the whole depth range of the first zone, thereby facilitating acquisition of corresponding refocused images at different refocusing points within the whole depth range of the first zone.

After the object distance adjustment range is determined, a bending degree of the at least one imaging zone is adjusted according to the object distance adjustment range. For example, the at least one imaging zone is adjusted to bend along a first direction, to cause a distance from any pixel point of the at least one imaging zone after being adjusted to the reference point to fall within the object distance adjustment range. Under a circumstance that a reference point of the sub-lens is fixed, a surface of the at least one imaging zone is adjusted from an original flat surface to a curved surface that bends along a direction. In this way, compared with a maximum distance difference between each pixel point and the reference point when the surface of the at least one imaging zone is a flat surface, a maximum distance difference between each pixel point and the reference point when the surface of the at least one imaging zone is a curved surface may be increased or reduced, thereby causing a refocusing point range of a light field sub-image that corresponds to the first region in a light field image to be increased or reduced. The curved surface comprises a surface with a single curvature. For example, a curved surface of the at least one imaging zone of the image sensor after being adjusted is a spherical surface, so as to reduce adjustment complexity. Under this circumstance, a maximum distance difference between each pixel point of an imaging zone and a reference point (such as a center) of a corresponding sub-lens is equal to a difference between a distance $v_1$ from an edge pixel point of the imaging zone to the center of the sub-lens and a distance $v_2$ from a central pixel point of the imaging zone to the center of the sub-lens. Alternatively, the curved surface may further comprise a group of several surfaces with different curvatures, which is not limited in this embodiment of the present application.

For example, the first direction comprises a direction of increasing a distance from a pixel point of the at least one imaging zone to a reference point. When the solution is adopted to adjust a bending degree of the at least one imaging zone, the maximum distance difference is increased compared with a maximum distance difference before adjustment, thereby causing a refocusing range of a light field sub-image that corresponds to the first region in a light field image to cover a depth range of the first zone as far as possible.

For another example, the first direction comprises a direction of reducing a distance from a pixel point of the at least one imaging zone to a reference point. When the solution is adopted, the maximum distance difference is reduced compared with a maximum distance difference before adjustment, thereby causing a refocusing accuracy within a depth range of the first zone that is covered by a refocusing range of a light field sub-image that corresponds to the first region to be improved.

Optionally, the reference point may comprise but is not limited to a central point of the sub-lens. The solution is favorable to reducing an error caused by a spherical shape of the sub-lens in determining the distance or distance difference.

Figure 3:
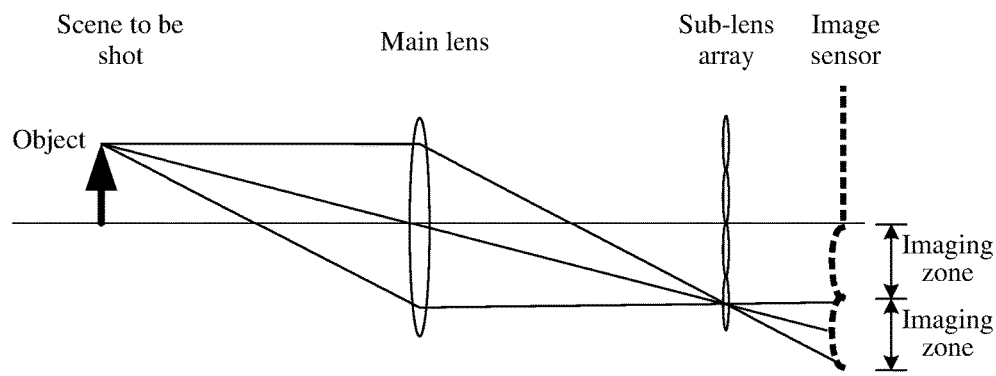
FIG. 3 is a schematic structural diagram of a light field camera after being adjusted according to an embodiment of the present application.
Figure 4:
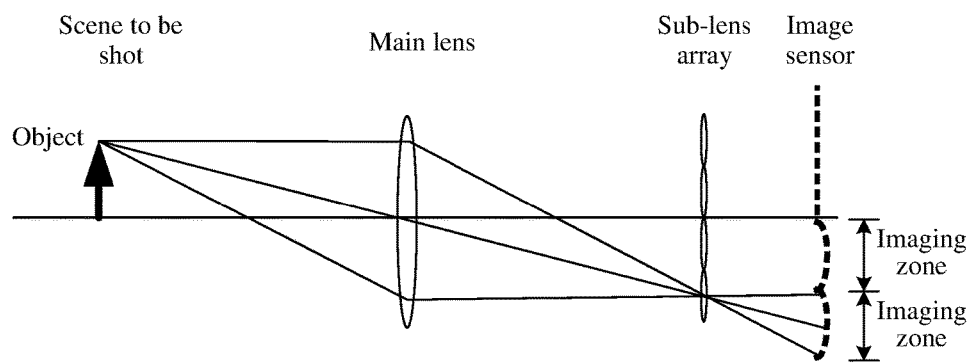
FIG. 4 is a schematic structural diagram of another light field camera after being adjusted according to an embodiment of the present application.

In practical application, the manner of adjusting a bending degree of an imaging zone of the image sensor may be selected according to actual demands, which is not limited in this embodiment of the present application. In an alternative implementation manner, a bending adjustment control instruction is determined according to the object distance adjustment range; and a bending degree of the at least one imaging zone is adjusted according to the bending adjustment control instruction. For example, the image sensor is a flexible image sensor. Through a manner of applying a gas pressure action or a voltage action on a different lining that corresponds to an imaging zone to be adjusted, a surface of the imaging zone is protruded (as shown in FIG. 3) or sunk (as shown in FIG. 4) relative to the sub-lens, causing a maximum distance difference between each pixel point of the imaging zone and a reference point (such as a center) of the sub-lens to be accordingly increased or reduced, thereby adjusting a refocusing point range of a light field sub-image that corresponds to the first zone in a light field image to be accordingly increased or reduced. It should be noted that, FIG. 3 and FIG. 4 correspond to a case when a part of an imaging zone (the at least one imaging zone) of the image sensor is adjusted to be a curved surface, but for a zone other than the at least one imaging zone in the image sensor, whether to perform adjustment on a bending degree or synchronously perform adjustment on a bending degree may be determined according to actual demands. Or, the entirety of the scene to be shot may be considered as the first region according to actual demands, that is, bending degree adjustment is performed on the entirety of all imaging zones of the image sensor, or the like. It may be determined according to actual demands, which is not limited in this embodiment of the present application.

It may be understood by a person skilled in the art that, in any one of the foregoing methods of specific implementation manners of the present application, the value of the serial number of each step described above does not mean an execution sequence, and the execution sequence of the steps should be determined according to the function and internal logic thereof, and should not constitute any limitation to the implementation procedure of the specific implementation manners of the present application.

Figure 5:
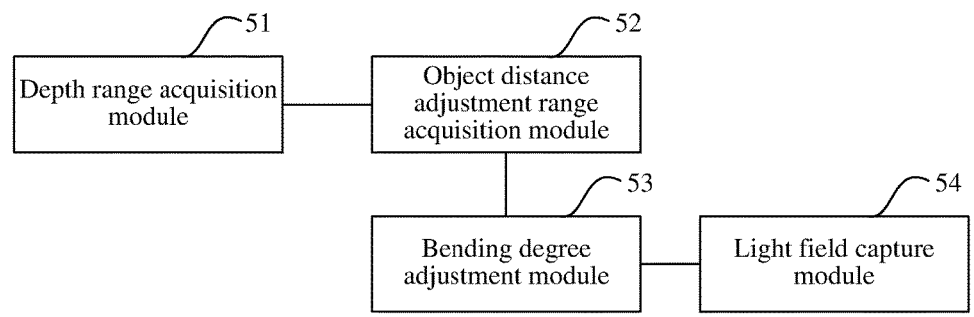
FIG. 5 is a logic block diagram of an apparatus for controlling light field capture according to an embodiment of the present application.

FIG. 5 is a logic block diagram of an apparatus for controlling light field capture according to an embodiment of the present application. As shown in FIG. 5, the apparatus for controlling light field capture provided by this embodiment of the present application comprises: a depth range acquisition module 51, an object distance adjustment range acquisition module 52, a bending degree adjustment module 53, and a light field capture module 54.

The depth range acquisition module 51 is configured to acquire a depth range of a first zone, the first zone being at least a part of a scene to be shot.

The object distance adjustment range acquisition module 52 is configured to determine, according to the acquired depth range, an object distance adjustment range from a pixel point of at least one imaging zone to a reference point of a sub-lens, the at least one imaging zone being an imaging zone that affects light field capture of the first zone in an image sensor of a light field camera, the sub-lens being a sub-lens that corresponds to the at least one imaging zone in a sub-lens array of the light field camera.

The bending degree adjustment module 53 is configured to adjust, according to the object distance adjustment range, a bending degree of the at least one imaging zone.

The light field capture module 54 is configured to perform, based on the image sensor after being adjusted, light field capture on the scene to be shot.

According to the technical solution provided by the embodiments of the present application, for light field capture performed based on a light field camera on a light field image of a scene to be shot, according to a depth range of at least a part (namely, a first zone) of a scene to be shot, a distance from each pixel point of a corresponding imaging zone of an image sensor to a reference point of a corresponding sub-lens may be adjusted, to cause all distances that correspond to the pixel points to fall within an object distance adjustment range that corresponds to the first zone. Compared with a maximum distance difference between each pixel point of a corresponding imaging zone of the image sensor before adjustment and a reference point of a corresponding sub-lens, a maximum distance difference between each pixel point of a corresponding imaging zone of the image sensor after being adjusted and a reference point of a corresponding sub-lens has been changed, thereby causing a refocusing point range of a light field image acquired by the image sensor after being adjusted that corresponds to the first zone to change accordingly, so as to achieve an adjustable refocusing point range and better satisfy diversified actual application demands of a subject such as a user or a device.

There is no limit to the manners in which the apparatus for controlling light field capture is embodied. For example, the apparatus for controlling light field capture may be an independent component, the component cooperating with a light field camera in communications; or the apparatus for controlling light field capture may be integrated as a functional module into an image acquisition device comprising a light field camera, which is not limited in this embodiment of the present application.

Figure 6:
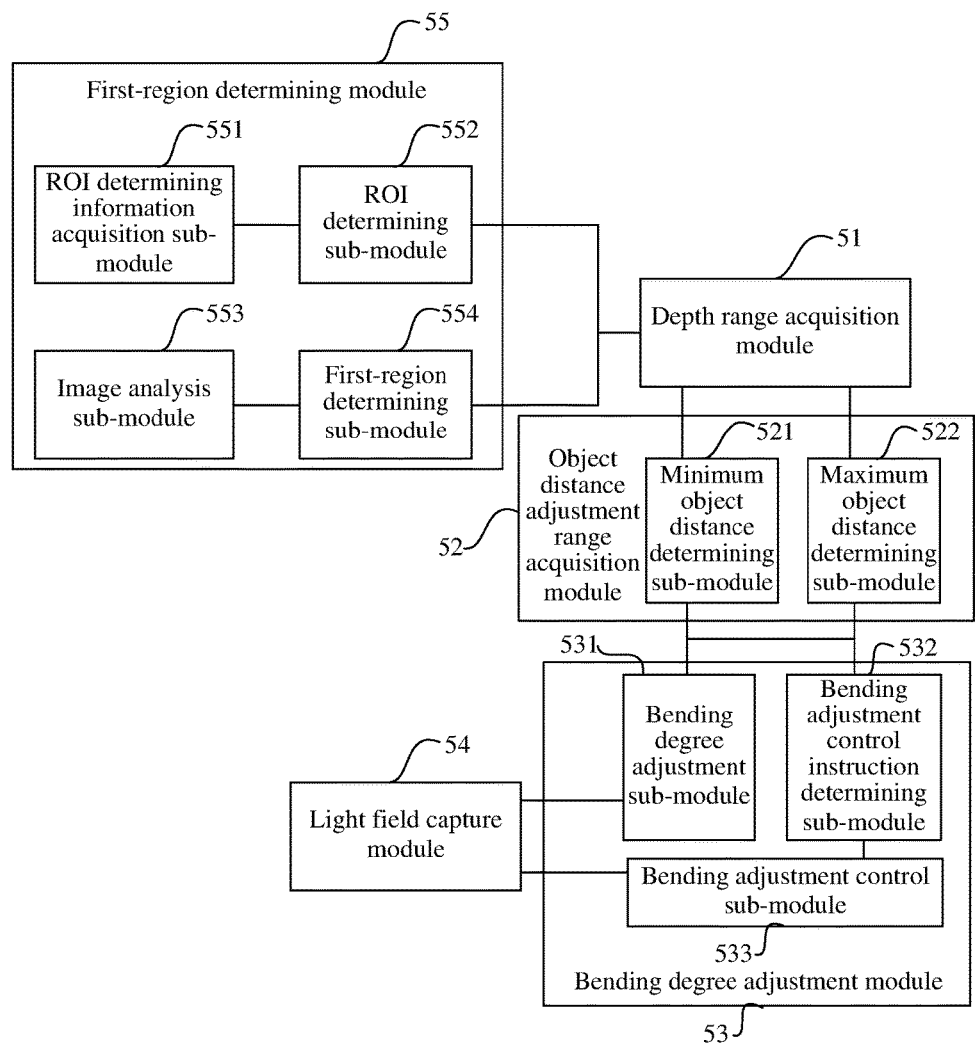
FIG. 6 is a logic block diagram of another apparatus for controlling light field capture according to an embodiment of the present application.

Optionally, as shown in FIG. 6, the apparatus for controlling light field capture further comprises a first-region determining module 55. The first-region determining module 55 is configured to determine a first region. In the solution, a part of a current scene to be shot may be determined in advance according to actual demands as the first region, thereby better satisfying personalized application demands of a subject such as a user or a device.

In an alternative implementation manner, the first-region determining module 55 comprises an ROI determining information acquisition sub-module 551 and an ROI determining sub-module 552. The ROI determining information acquisition sub-module 551 is configured to acquire, based on a preview image of the scene to be shot by the light field camera, ROI determining information. The ROI determining sub-module 552 is configured to determine a region that corresponds to the ROI determining information in the scene to be shot as the first region. In the solution, determining of the first region is more consistent with a user's actual demands, thereby better satisfying a user's personalized application demands.

In another alternative embodiment, the first-region determining module 55 comprises an image analysis sub-module 553 and a first-region determining sub-module 554. The image analysis sub-module 553 is configured to perform an image analysis on a preview image of the scene to be shot by the light field camera. The first-region determining sub-module 554 is configured to determine, according to a result of the image analysis, the first region. In the solution, determining of the first region is more intelligent, thereby improving efficiency and universality of the first region determining.

Figure 7:
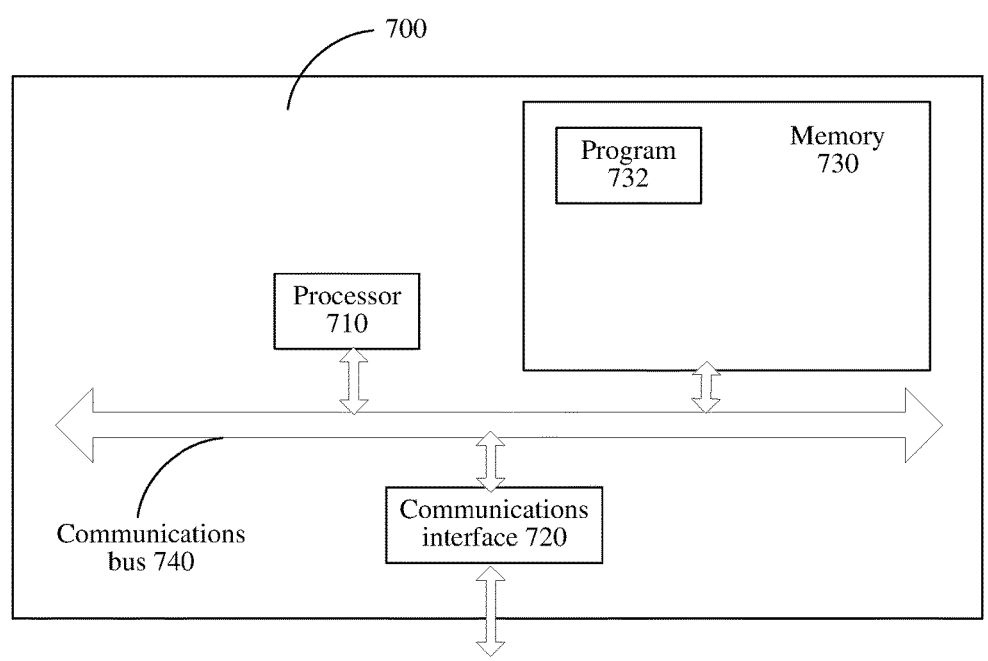
FIG. 7 is a logic block diagram of still another apparatus for controlling light field capture according to an embodiment of the present application.

Optionally, as shown in FIG. 7, the object distance adjustment range acquisition module 52 comprises: a minimum object distance determining sub-module 521 and a maximum object distance determining sub-module 522. The minimum object distance determining sub-module 521 is configured to determine, according to a first depth within the acquired depth range, a minimum object distance within the object distance adjust range. The maximum object distance determining sub-module 522 is configured to determine, according to a second depth within the depth range, a maximum object distance within the object distance adjustment range, wherein the second depth is greater than the first depth. Based on the solution, a refocusing point range of a light field sub-image that corresponds to the first region in the light field image is dispersedly distributed within the whole depth range of the first zone, so as to acquire corresponding refocused images at different refocusing points within the whole depth range of the first zone. Further, optionally, the first depth is a minimum depth within the depth range, and the second depth is a maximum depth within the depth range. The solution facilitates acquisition of corresponding refocused images at different refocusing points within the whole depth range of the first zone.

Optionally, the bending degree adjustment module 53 comprises a bending degree adjustment sub-module 531. The bending degree adjustment sub-module 531 is configured to adjust the at least one imaging zone to bend along a first direction, to cause a distance from any pixel point of the at least one imaging zone after being adjusted to the reference point to fall within the object distance adjustment range. The solution is simple and easily implemented.

Optionally, the first direction comprises a direction of increasing a distance from a pixel point of the at least one imaging zone to a reference point. In the solution, the maximum distance difference is increased compared with a maximum distance difference before adjustment, thereby causing a refocusing image of a light field sub-image that corresponds to the first region in a light field image to cover a depth range of the first zone as far as possible.

Alternatively, the first direction comprises a direction of reducing a distance from a pixel point of the at least one imaging zone to a reference point. In the solution, the maximum distance difference is reduced compared with a maximum distance difference before adjustment, thereby causing a refocusing accuracy within a depth range of the first zone that is covered by a refocusing range of a light field sub-image that corresponds to the first region to be improved.

Optionally, the reference point is a central point of the sub-lens, so as to reduce an error caused by a spherical shape of the sub-lens in determining the distance or distance difference.

Optionally, a surface of any one imaging zone after being adjusted among the at least one imaging zone is a spherical surface, so as to reduce adjustment complexity.

Optionally, the bending degree adjustment module 53 comprises a bending adjustment control instruction determining sub-module 532 and a bending adjustment control sub-module 533. The bending adjustment control instruction determining sub-module 531 is configured to determine, according to the object distance adjustment range, a bending adjustment control instruction. The bending adjustment control sub-module 532 is configured to adjust, according to the bending adjustment control instruction, a bending degree of the at least one imaging zone. The solution is simple and easily implemented.

FIG. 7 is a structural block diagram of still another apparatus for controlling light field capture provided by an embodiment of the present application. The specific implementation manner of the apparatus 700 for controlling light field capture is not limited in specific embodiments of the present application. As shown in FIG. 7, the apparatus 700 for controlling light field capture may comprise:

a processor 710, a communications interface 720, a memory 730, and a communications bus 740, wherein:

the processor 710, the communications interface 720, and the memory 730 communicate with each other by using the communications bus 740;

the communications interface 720 is configured to communication with, for example, a device having a function of communications, and an external optical source; and the processor 710 is configured to execute a program 732, and specifically, can perform relevant steps in any one of the foregoing embodiments of a method for controlling light field capture.

For example, the program 732 may comprise program codes, wherein the program codes comprise computer operation instructions.

The processor 710 may be a central processing unit (CPU for short), an application specific integrated circuit (ASIC for short), or one or more integrated circuits configured to implement the embodiments of the present application.

The memory 730 is configured to store the program 732. The memory 730 may comprise a random access memory (RAM for short), and may also comprise a non-volatile memory, for example, at least one magnetic disk memory.

For example, in an alternative implementation manner, the processor 710 may perform, by executing the program 732, the following steps: acquiring a depth range of a first zone, the first zone being at least a part of a scene to be shot; determining, according to the acquired depth range, an object distance adjustment range from a pixel point of at least one imaging zone to a reference point of a sub-lens, the at least one imaging zone being an imaging zone that affects light field capture of the first zone in an image sensor of a light field camera, the sub-lens being a sub-lens that corresponds to the at least one imaging zone in a sub-lens array of the light field camera; adjusting, according to the object distance adjustment range, a bending degree of the at least one imaging zone; and performing, based on the image sensor after being adjusted, light field capture on the scene to be shot.

In another alternative implementation manner, the processor 710 can also perform, by executing the program 732, steps mentioned in any other one of the foregoing embodiments, and the details are not described herein again.

For specific implementation of steps of the program 732, refer to the description of corresponding steps, modules, sub-modules and units in the foregoing embodiments. The details are not described herein again. A person skilled in the art may understand that, for the specific operation procedure of the above devices and modules, the description of corresponding procedures in the foregoing method embodiments may be referred to for the purpose of convenient and brief description. The details are not described herein again.

In the foregoing embodiments of the present application, the serial number and/or sequence of the embodiments are only used for the convenience of description, and do not represent inferiority or superiority of the embodiments. The description of each embodiment has different focus. For any part of an embodiment not described in details, refer to relevant description of another embodiment. For relevant description of the implementation principle or process of apparatus, device or system embodiments, refer to records of relevant method embodiments, and the details are not described herein again.

A person of ordinary skill in the art may recognize that, the units, methods and procedures of each example described with reference to the embodiments disclosed herein, can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or a part thereof contributing to the existing art, or a part of the technical solutions may be implemented in the form of a software product. The computer software product is stored in a storage medium and comprises several instructions for instructing a computer device (which may be a personal computer, a server, a network device, or the like) to perform all or some of the steps of the methods in the embodiments of the present application. The foregoing storage medium comprises: any medium that can store program code, such as a USB flash drive, a removable hard disk, a read-only memory (ROM for short), a random access memory (RAM for short), a magnetic disk, or an optical disc.

In the apparatus, method and system embodiments of the present application, apparently, each component (such as a system, a sub-system, a module, a sub-module, a unit, and a sub-unit) or each step may be decomposed, combined and/or recombined after decomposition. Such decomposition and/or recombination shall be considered as an equivalent solution of the present application. In addition, in the above description of specific embodiments of the present application, a feature described and/or shown in one implementation manner may be used in one or more other implementation manners in a same or similar manner, combined with a feature of another implementation manner, or replace a feature of another implementation manner.

It should be emphasized that, the term "comprise" used herein refers to existence of a feature, an element, a step or a component, but does not exclude existence or addition of one or more other features, elements, steps or components.

Finally, it should be noted that, the above implementation manners are only used to describe the present application, rather than limit the present application. Various alterations and variants may also be made by a person of ordinary skill in the art without departing from the spirit and scope of the present application. Therefore, all equivalent technical solutions also belong to the scope of the present application, and the patent protection scope of the present application should be subject to the claims.

What is claimed is:

1. A method for controlling light field capture, comprising:
    acquiring a depth range of a first zone, the first zone being at least a part of a scene to be shot;
    determining, according to the acquired depth range, an object distance adjustment range from a pixel point of at least one imaging zone of an image sensor to a reference point of a sub-lens, the at least one imaging zone being an imaging zone that affects light field capture of the first zone in an image sensor of a light field camera, the sub-lens being a sub-lens that corresponds to the at least one imaging zone in a sub-lens array of the light field camera;
    adjusting, according to the object distance adjustment range, a bending degree of the at least one imaging zone; and
    performing, based on the image sensor after being adjusted, light field capture on the scene to be shot, wherein the adjusting, according to the object distance adjustment range, a bending degree of the at least one imaging zone comprises:

adjusting the at least one imaging zone of the image sensor to bend along a first direction, to cause a distance from any pixel point of the at least one imaging zone after being adjusted to the reference point to fall within the object distance adjustment range.

2. The method for controlling light field capture of claim 1, wherein the method further comprises: determining a first region.

3. The method for controlling light field capture of claim 2, wherein the determining the first region comprises:

acquiring, based on a preview image of the scene to be shot by the light field camera, information on determining of a region of interest (ROI); and determining a region that corresponds to the ROI determining information in the scene to be shot as the first region.

4. The method for controlling light field capture of claim 2, wherein the determining the first region comprises:

performing an image analysis on a preview image of the scene to be shot by the light field camera; and determining, according to a result of the image analysis, the first region.

5. The method for controlling light field capture of claim 1, wherein the determining, according to the acquired depth range, an object distance adjustment range comprises:

determining, according to a first depth within the acquired depth range, a minimum object distance within the object distance adjustment range; and determining, according to a second depth within the acquired depth range, a maximum object distance within the object distance adjustment range, wherein the second depth is greater than the first depth.

6. The method for controlling light field capture of claim 5, wherein the first depth is a minimum depth within the depth range, and the second depth is a maximum depth within the depth range.

7. The method for controlling light field capture of claim 1, wherein the first direction comprises: a direction of increasing a distance from a pixel point of the at least one imaging zone to the reference point.

8. The method for controlling light field capture of claim 1, wherein the first direction comprises: a direction of reducing a distance from a pixel point of the at least one imaging zone to the reference point.

9. The method for controlling light field capture of claim 1, wherein the reference point is a central point of the sub-lens.

10. The method for controlling light field capture of claim 1, wherein a surface of any imaging zone after being adjusted among the at least one imaging zone is a spherical surface.

11. The method for controlling light field capture of claim 1, wherein the adjusting, according to the object distance adjustment range, a bending degree of the at least one imaging zone comprises:

determining, according to the object distance adjustment range, a bending adjustment control instruction; and adjusting, according to the bending adjustment control instruction, a bending degree of the at least one imaging zone.

12. An apparatus for controlling light field capture, comprising:

a depth range acquisition module, configured to acquire a depth range of a first zone, the first zone being at least a part of a scene to be shot;

an object distance adjustment range acquisition module, configured to determine, according to the acquired depth range, an object distance adjustment range from a pixel point of at least one imaging zone of an image sensor to a reference point of a sub-lens, the at least one imaging zone being an imaging zone that affects light field capture of the first zone in an image sensor of a light field camera, the sub-lens being a sub-lens that corresponds to the at least one imaging zone in a sub-lens array of the light field camera;

a bending degree adjustment module, configured to adjust, according to the object distance adjustment range, a bending degree of the at least one imaging zone; and a light field capture module, configured to perform, based on the image sensor after being adjusted, light field capture on the scene to be shot, wherein the bending degree adjustment module comprises:

a bending degree adjustment sub-module, configured to adjust the at least one imaging zone of the image sensor to bend along a first direction, to cause a distance from any pixel point of the at least one imaging zone after being adjusted to the reference point to fall within the object distance adjustment range.

13. The apparatus for controlling light field capture of claim 12, further comprising:

a first-region determining module, configured to determine a first region.

14. The apparatus for controlling light field capture of claim 13, wherein the first-region determining module comprises:

a region-of-interest (ROI) determining information acquisition sub-module, configured to acquire, based on a preview image of the scene to be shot by the light field camera, ROI determining information; and a region-of-interest (ROI) determining sub-module, configured to determine a region that corresponds to the ROI determining information in the scene to be shot as the first region.

15. The apparatus for controlling light field capture of claim 13, wherein the first-region determining module comprises:

an image analysis sub-module, configured to perform an image analysis on a preview image of the scene to be shot by the light field camera; and a first-region determining sub-module, configured to determine, according to a result of the image analysis, the first region.

16. The apparatus for controlling light field capture of claim 12, wherein the object distance adjustment range acquisition module comprises:

a minimum object distance determining sub-module, configured to determine, according to a first depth within the acquired depth range, a minimum object distance within the object distance adjust range; and a maximum object distance determining sub-module, configured to determine, according to a second depth within the depth range, a maximum object distance within the object distance adjustment range, wherein the second depth is greater than the first depth.

17. The apparatus for controlling light field capture of claim 16, wherein the first depth is a minimum depth within the depth range, and the second depth is a maximum depth within the depth range.

18. The apparatus for controlling light field capture of claim 12, wherein the first direction comprises: a direction of increasing a distance from a pixel point of the at least one imaging zone to the reference point.

19. The apparatus for controlling light field capture of claim 12, wherein the first direction comprises: a direction of reducing a distance from a pixel point of the at least one imaging zone to the reference point.

20. The apparatus for controlling light field capture of claim 12, wherein the reference point is a central point of the sub-lens.

21. The apparatus for controlling light field capture of claim 12, wherein a surface of any imaging zone after being adjusted among the at least one imaging zone is a spherical surface.

22. The apparatus for controlling light field capture of claim 12, wherein the bending degree adjustment module comprises:
   a bending adjustment control instruction determining sub-module, configured to determine, according to the object distance adjustment range, a bending adjustment control instruction; and
   a bending adjustment control sub-module, configured to adjust, according to the bending adjustment control instruction, a bending degree of the at least one imaging zone.

23. A computer readable storage apparatus, comprising at least one executable instruction, which, in response to execution, causes a processor to perform a method for controlling light field capture comprising:
   acquiring a depth range of a first zone, the first zone being at least a part of a scene to be shot;
   determining, according to the acquired depth range, an object distance adjustment range from a pixel point of at least one imaging zone of an image sensor to a reference point of a sub-lens, the at least one imaging zone being an imaging zone that affects light field capture of the first zone in an image sensor of a light field camera, the sub-lens being a sub-lens that corresponds to the at least one imaging zone in a sub-lens array of the light field camera;
   adjusting, according to the object distance adjustment range, a bending degree of the at least one imaging zone; and
   performing, based on the image sensor after being adjusted, light field capture on the scene to be shot,
   wherein the adjusting, according to the object distance adjustment range, a bending degree of the at least one imaging zone comprises:
   adjusting the at least one imaging zone of the image sensor to bend along a first direction, to cause a distance from any pixel point of the at least one imaging zone after being adjusted to the reference point to fall within the object distance adjustment range.

24. An apparatus for controlling light field capture, characterized by comprising a processor and a memory, the memory storing computer executable instructions, the processor being connected to the memory through a communication bus, and when the apparatus for controlling task migration operates, the processor executing the computer executable instructions stored in the memory, so that the apparatus for controlling task migration executes operations, comprising:
   acquiring a depth range of a first zone, the first zone being at least a part of a scene to be shot;
   determining, according to the acquired depth range, an object distance adjustment range from a pixel point of at least one imaging zone of an image sensor to a reference point of a sub-lens, the at least one imaging zone being an imaging zone that affects light field capture of the first zone in an image sensor of a light field camera, the sub-lens being a sub-lens that corresponds to the at least one imaging zone in a sub-lens array of the light field camera;
   adjusting, according to the object distance adjustment range, a bending degree of the at least one imaging zone; and
   performing, based on the image sensor after being adjusted, light field capture on the scene to be shot,
   wherein the adjusting, according to the object distance adjustment range, a bending degree of the at least one imaging zone comprises:
   adjusting the at least one imaging zone of the image sensor to bend along a first direction, to cause a distance from any pixel point of the at least one imaging zone after being adjusted to the reference point to fall within the object distance adjustment range.

* * * * *